(12) United States Patent
Burdenski et al.

(10) Patent No.: US 11,909,221 B2
(45) Date of Patent: Feb. 20, 2024

(54) DEVICE FOR WIRELESS TRANSMISSION OF ELECTRICAL ENERGY

(71) Applicant: paragon GmbH & Co. KGaA, Delbrück (DE)

(72) Inventors: Ralf Burdenski, Nuremberg (DE); Wolfgang Sauer, Zirndorf (DE)

(73) Assignee: PARAGON GMBH & CO. KGAA, Delbruck (DE)

( * ) Notice: Subject to any disclaimer, the term of this patent is extended or adjusted under 35 U.S.C. 154(b) by 9 days.

(21) Appl. No.: 17/110,821

(22) Filed: Dec. 3, 2020

(65) Prior Publication Data
US 2021/0167632 A1 Jun. 3, 2021

(30) Foreign Application Priority Data
Dec. 3, 2019 (DE) .................. 10 2019 132 815.2

(51) Int. Cl.
| | |
|---|---|
| *H02J 50/10* | (2016.01) |
| *H02J 50/00* | (2016.01) |
| *B60R 16/02* | (2006.01) |
| *H01F 27/28* | (2006.01) |

(Continued)

(52) U.S. Cl.
CPC .............. *H02J 50/10* (2016.02); *B60R 16/02* (2013.01); *H01F 27/085* (2013.01); *H01F 27/2876* (2013.01); *H01F 38/14* (2013.01); *H02J 50/005* (2020.01)

(58) Field of Classification Search
CPC .................................. H02J 50/10; H02J 50/005
See application file for complete search history.

(56) References Cited

U.S. PATENT DOCUMENTS

| | | | |
|---|---|---|---|
| 2015/0115877 A1* | 4/2015 | Arai ........................ | H02J 50/60 320/108 |
| 2016/0056661 A1* | 2/2016 | Tanaka .................. | H02J 7/0042 320/108 |
| 2017/0047769 A1* | 2/2017 | Kim ...................... | H02J 7/0042 |

(Continued)

FOREIGN PATENT DOCUMENTS

| | | |
|---|---|---|
| DE | 102018201300 A1 | 8/2019 |
| JP | 201745792 A | 9/2018 |

(Continued)

*Primary Examiner* — Daniel Kessie
(74) *Attorney, Agent, or Firm* — LUCAS & MERCANTI, LLP; Klaus P. Stoffel

(57) ABSTRACT

A device for wireless transmission of electrical energy to an energy receiver, including a support surface, on which the energy receiver is arranged during energy transmission. The device includes an induction coil for transmitting electrical energy and an air duct extending within the device from an opening formed in the support surface into the device. The opening is arranged over the induction coil. The air duct is routed through a winding of the induction coil, which is preferably arranged directly under the support surface. Advantageously, the support surface is essentially rectangular, and the opening is formed on or at least close to a longitudinal axis of the support surface and is formed at a distance from an edge of the support surface. At least one projection is formed on the support surface for holding the receiving unit at a distance from the support surface so that air conducted into the air duct can better flow underneath.

19 Claims, 3 Drawing Sheets

(51) Int. Cl.
    *H01F 27/08*    (2006.01)
    *H01F 38/14*    (2006.01)

(56) References Cited

U.S. PATENT DOCUMENTS

| | | | |
|---|---|---|---|
| 2018/0083493 A1* | 3/2018 | Hwang | H02J 50/12 |
| 2018/0224909 A1* | 8/2018 | Koo | H02J 50/10 |
| 2019/0221353 A1* | 7/2019 | Hwang | H01F 38/14 |
| 2020/0235593 A1* | 7/2020 | Jang | H02J 50/80 |
| 2020/0373072 A1* | 11/2020 | Leem | H02J 50/005 |

FOREIGN PATENT DOCUMENTS

| | | |
|---|---|---|
| WO | 2010026805 A1 | 3/2010 |
| WO | 2017190603 A1 | 11/2017 |

\* cited by examiner

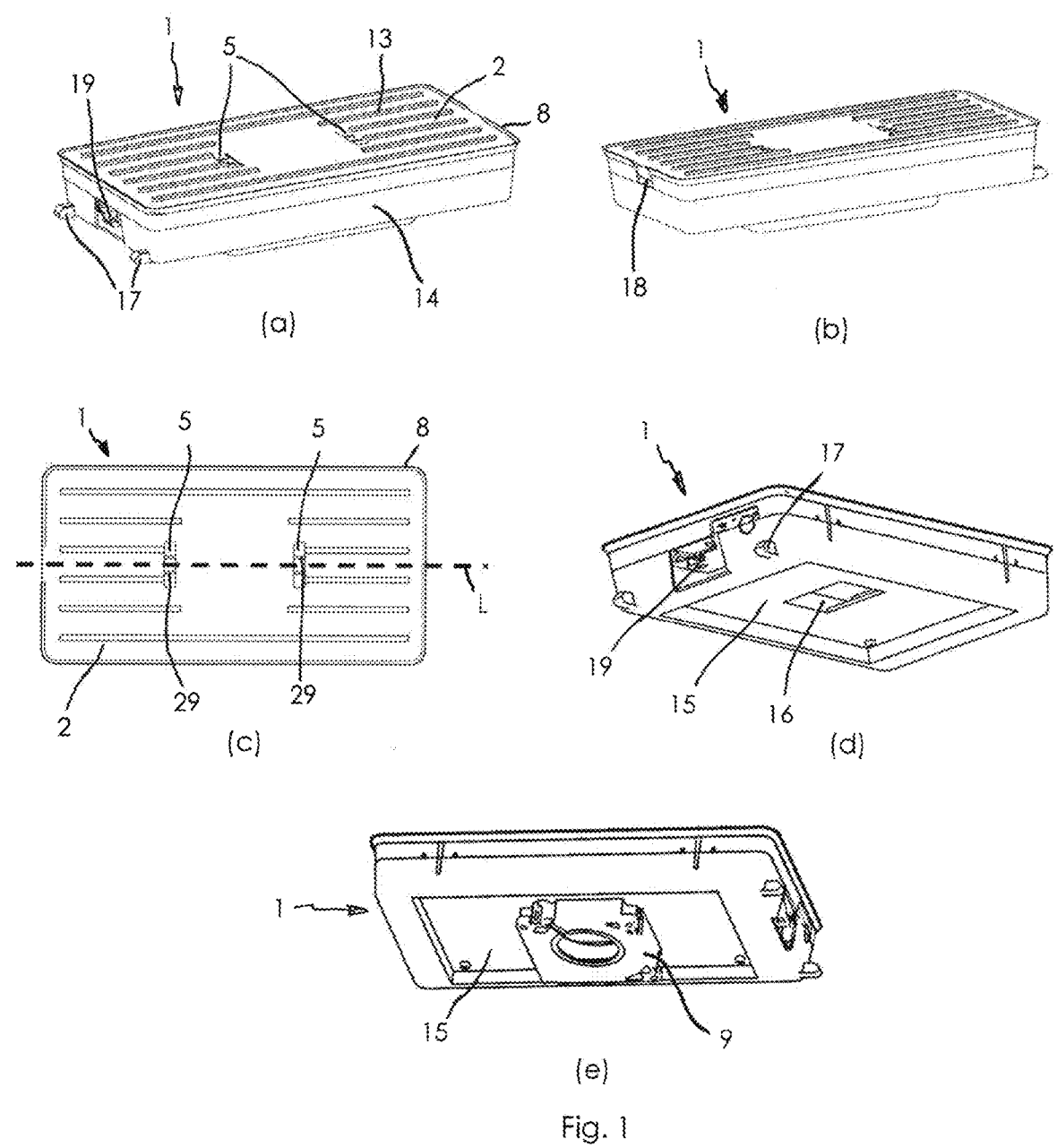
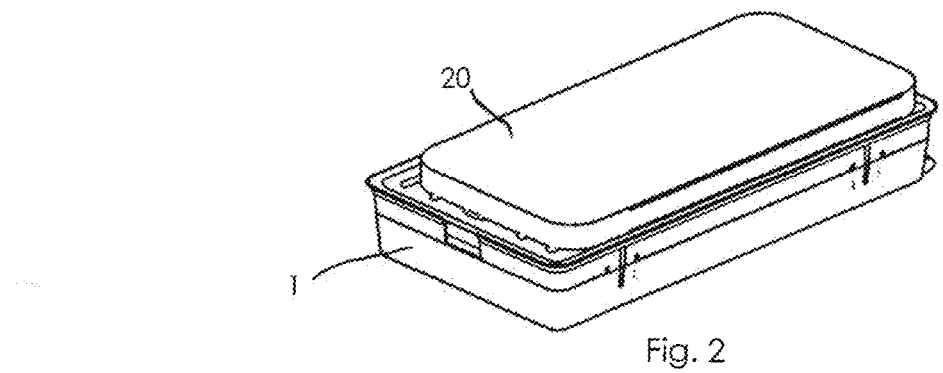
Fig. 1
Fig. 2

DEVICE FOR WIRELESS TRANSMISSION OF ELECTRICAL ENERGY

The present application claims priority of DE 10 2019 132 815.2, filed Dec. 3, 2019, the priority of this application is hereby claimed and this application is incorporated herein by reference.

BACKGROUND OF THE INVENTION

The invention relates to a device for the wireless transmission of electrical energy to an energy receiver, in particular to a smartphone or a smartwatch, which comprises a support surface, on which the energy receiver is to be arranged during the energy transmission, wherein the device comprises at least one induction coil for the transmission of the electrical energy and at least one air duct extending within the device, which extends from an opening formed in the support surface into the device.

A device of this type is known from DE 10 2018 201 300 A1, which describes a device for charging a mobile terminal. In order to be able to guide the air flow, on the one hand, along an underside of a charging electronics system and, on the other hand, along a top side of the support surface, the opening is formed offset with respect to the charging electronics system and in the edge region in the support surface.

SUMMARY OF THE INVENTION

The problem addressed by the invention is that of creating a device of the type mentioned at the outset, which allows for a better cooling of the receiving unit during the energy transmission.

According to the invention, this problem is solved in that the opening is arranged over the induction coil.

The arrangement of the opening makes it possible to provide the opening in a central area of the support surface and at a distance from its edge. During the energy transmission, the air flow is conducted, in a targeted manner, to a central area of the energy receiver and, there, can therefore achieve a particularly good cooling effect. Since the energy receiver, in particular when it is a smartphone or a smartwatch, heats up to a particularly great extent in the central area during the energy transmission and during operation, and the heat dissipation from there is more difficult than from the edge region, it can be cooled to a considerably better extent with the aid of the device according to the invention as compared to the known device.

This has a particularly positive effect on the speed for charging a battery of the energy receiver, because, in the case of many currently utilized energy receivers, a throttling of the charging speed is provided when the device temperature increases and, with the aid of the device according to the invention, a heating of the energy receiver resulting in the throttling can be avoided. In the same way, the improved cooling also has a positive effect on the working speed of the processor for the case in which the energy receiver comprises a processor, since the processor performance is often also throttled as the device temperature increases.

The invention proves to be particularly advantageous when the device is a part of a passenger compartment interior of a vehicle, in particular of an automobile. The device is preferably provided for the arrangement at a center console or a center tunnel, an interior door trim, in a glove compartment, in an arm rest, at a dashboard, at an arm rest, and/or at a back side of a backrest of a seat.

In one particularly preferred embodiment of the invention, the device is designed as a prefabricated component for the passenger compartment and, for this purpose, preferably comprises means for its mechanical connection, electrical connection to the power supply, electronic signal connection, and/or data transport connection to the vehicle. The mechanical fasteners are advantageously provided for attaching the device at another component of the passenger compartment. The means for the electronic signal connection and/or for the data transport connection are preferably utilized for the integration and connection of the device into/onto the vehicle electronics system and/or a vehicle computer, in particular into/onto a vehicle antenna, a computer-based vehicle regulation or control device, or a multimedia unit of the vehicle computer.

Advantageously, the opening is arranged perpendicularly over the induction coil with respect to a plane, in which a winding of the induction coil is formed. It has proven particularly advantageous to arrange the opening centrally over the winding in the induction coil.

In one particularly preferred embodiment of the invention, the duct is routed through the winding of the induction coil, wherein an open area is preferably provided in the winding for this purpose. The duct is advantageously routed close to or through a center of the induction coil. Preferably, the duct is formed, at least in some areas, coaxially with or close to a coil axis of the induction coil. The duct can be formed, at least in some areas, coaxially with an axis of symmetry, which extends perpendicularly onto the plane, in which the coil is formed, and through a point of symmetry and/or a center of the coil.

The induction coil is advantageously arranged directly under the support surface in order to allow for an efficient energy transmission onto the energy receiver.

While it would be conceivable to fasten the induction coil at an inner side of a component forming the support surface, for example, a support plate, in one embodiment of the invention, the device comprises a carrier, in particular a carrier plate, for holding the induction coil. The carrier preferably comprises a recess, through which the duct extends. The recess is preferably formed adjacent to the aforementioned open area in the coil, particularly preferably close to a center of the induction coil and/or on or in the area of the aforementioned coil axis or the axis of symmetry.

In a further embodiment of the invention, the support surface, which is preferably formed by a support plate, is essentially rectangular.

Advantageously, the opening is formed on or at least close to a longitudinal axis of the support surface.

It has proven advantageous to provide the opening at a distance from an edge of the support surface, preferably at least at a distance of 1.5 cm, particularly preferably of 2 cm.

In one embodiment of the invention, the device comprises a turbomachine for generating an air flow in the air duct.

Advantageously, the turbomachine is formed by a ventilator, preferably by an axial ventilator, a diagonal ventilator, or a radial ventilator. It is preferably provided for forming the air flow in the direction from the support surface into the duct. In forming the air flow having this flow direction, ambient air is initially transported past the energy receiver into the opening and, from there, into the air duct. In particular when the device is provided for utilization in the passenger compartment of a vehicle, air flows, which can be unpleasant, are prevented from arising in the passenger compartment.

It is understood that the turbomachine can also be provided for forming the air flow in the direction from the duct toward the support surface. In this case, the energy receiver is blown upon from the direction of the device during the energy transmission.

Advantageously, the device comprises at least one further opening, which has a flow connection to the air duct. Depending on the direction of flow, the air passes through the further opening out of the device or into the device. While it would be conceivable to also provide the further opening in the support surface, in the preferred embodiment of the invention, it is formed onto a side of the device facing away from the support surface, in particular on an underside of the device, which is to be arranged horizontally, if necessary. Depending on the structural requirement, it can be advantageous to form the further opening at a lateral wall of the device, which is preferably to be vertically arranged. It is understood that several of the further openings can be provided and the openings can be formed on the underside as well as on the lateral wall.

The device preferably comprises a housing, which forms the support surface, the underside, and the lateral wall.

In one further embodiment of the invention, the device comprises at least one means for directing the air, which is conducted through the duct, toward the induction coil and/or to at least one further electrical current-carrying component of the device, in particular an electronic control and/or regulation device. The air contributes not only to the cooling of the receiving unit, but also to the cooling of the induction coil and/or of the component. It has proven particularly advantageous to provide the means in such a way that the air can flow along a longitudinal side of the induction coil or of the component, in order to also achieve a good cooling of the device. Advantageously, the conduction means is provided in such a way that the air, after emerging from the duct, is conducted to the induction coil and/or the component.

In one further embodiment of the invention, the duct is closed at least in the area, in which it extends along the induction coil and/or the further electrically operated component of the device. As a result, liquid that passes through the opening into the device can be prevented from damaging the device and causing it not to function properly. It has proven particularly advantageous to provide the duct in such a way that it is designed to be closed up into an outlet area of the device, through which liquid entering the device can flow out of the device. An outlet opening in the outlet area is advantageously arranged so far underneath the induction coil and/or the further electrically operated component that liquid entering through the air duct can emerge directly out of the device without accumulating there.

Advantageously, at least one projection is formed on the support surface, which is provided for holding the receiving unit at a distance from the support surface so that the air to be conducted into the duct can flow uniformly underneath. The projection preferably comprises at least one fin and/or nub. The projection on the support surface can be arranged in such a way that at least one conduction duct is formed toward the opening when the energy receiver is set down. Multiple conduction ducts can be provided and designed in such a way that they extend radially toward the opening.

The projection can be formed, at least at its top side, from an elastomer, in particular rubber, in order to prevent the energy receiver from slipping when arranged on the device, for example, when this is moved together with the vehicle.

The support surface advantageously has such a size and shape that it is suitable for accommodating smartphones of a usual overall size. It has proven advantageous to provide the support surface in a length of 12 cm to 17 cm and a width in the range from 5 cm to 10 cm. A means for holding the receiving unit on the support surface can be provided at the edge of the support surface, which can be formed, for example, by an edge projection, a web, holding arms, and/or a clamping unit.

In one further embodiment of the invention, the device is configured for the wireless transmission of data to and/or from the energy receiver. The data transmission can be utilized for integrating and connecting the device into/at the vehicle electronics system and/or a vehicle computer, in particular into/at a vehicle antenna, a computer-based vehicle regulation or control device, or a multimedia unit of the vehicle computer.

For the wireless data transmission, the device is advantageously provided with a unit for the data transmission per WLAN, Bluetooth, or the like. It has proven particularly suitable, however, to provide a device for near field communication (NFC) as the device. Although a separate induction coil could be provided for the data transmission per NFC, it would be conceivable, however, to carry out the data exchange per electromagnetic induction via the aforementioned induction coil, which is provided for the energy transmission.

The invention further relates to a built-in unit, which is provided for a passenger compartment of a vehicle, in particular of an automobile or another motor vehicle. In one refinement of the invention, the built-in unit is part of a passenger compartment of a vehicle, in particular of an automobile or another motor vehicle.

BRIEF DESCRIPTION OF THE DRAWING

The invention is explained in greater detail in the following with reference to exemplary embodiments and the attached drawings, which relate to the exemplary embodiments. Wherein:

FIG. 1 shows a device according to the invention in various views,

FIG. 2 shows the device according to the invention, according to FIG. 1, during energy transmission onto an energy receiver, FIG. 3 schematically shows a vehicle.

DETAILED DESCRIPTION OF THE INVENTION

FIG. 1 shows a device according to the invention for the wireless transmission of electrical energy, which comprises a support surface 2 for accommodating an energy receiver. The support surface 2 has an essentially rectangular shape and a size such that smartphones of a currently usual size can be placed thereon. For this purpose, the longer sides of the support surface 2 can have a length between 12 cm and 17 cm and the shorter sides can have a length between 5 cm and 10 cm. It is understood that the device can also have other shapes, which are adapted to the shape of the particular energy receiver, depending on the size and shape of the energy receiver.

A smartphone 20 can be placed onto the support surface 2 as shown in FIG. 2 by way of example, in order to charge its battery and/or to supply it with current during operation.

Figure 3:
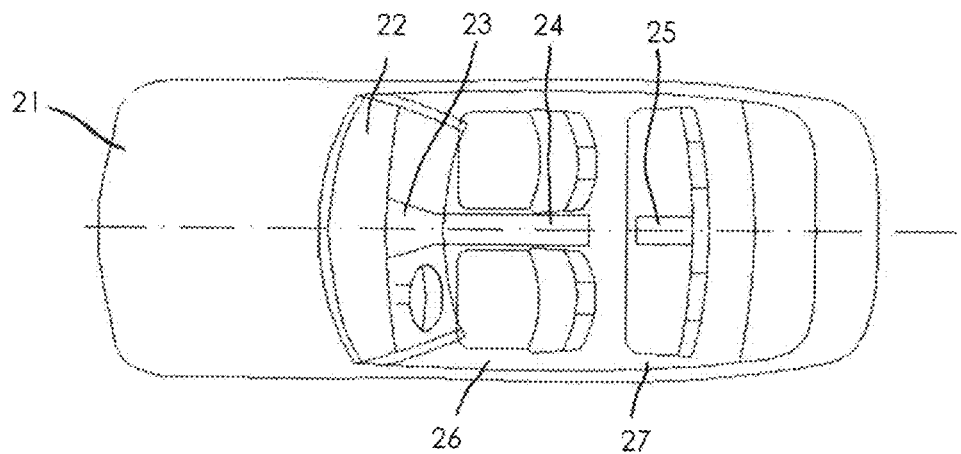

The device 1, which is preferably designed as a prefabricated component, can be provided in a glove compartment 22, in a center tunnel 23, 24, in an arm rest 25, or in an interior door trim 26, 27, as FIG. 3 schematically shows with reference to a vehicle 21, in particular an automobile or a boat. It is understood that other uses can also be considered. The device 1 could be provided, for example, in a piece of furniture or in a mobile battery charger.

Two openings 5 are formed in the support surface 2, through which air can be moved into or out of the device 1. The openings 4 are provided in a central area of the support surface 2. For this purpose, they are preferably formed at a distance from an edge 8 of the support surface 2, preferably at least 2 cm from the shorter sides and at least 1.5 cm from the longer sides of the support surface 2. They can be arranged on a longitudinal axis L of the support surface 2, as FIG. 1c shows.

The device 1 comprises lateral walls 14 and a base 15. One opening 16 is provided in the base 15, through which air can be moved into or out of the device 1.

Figure 4:
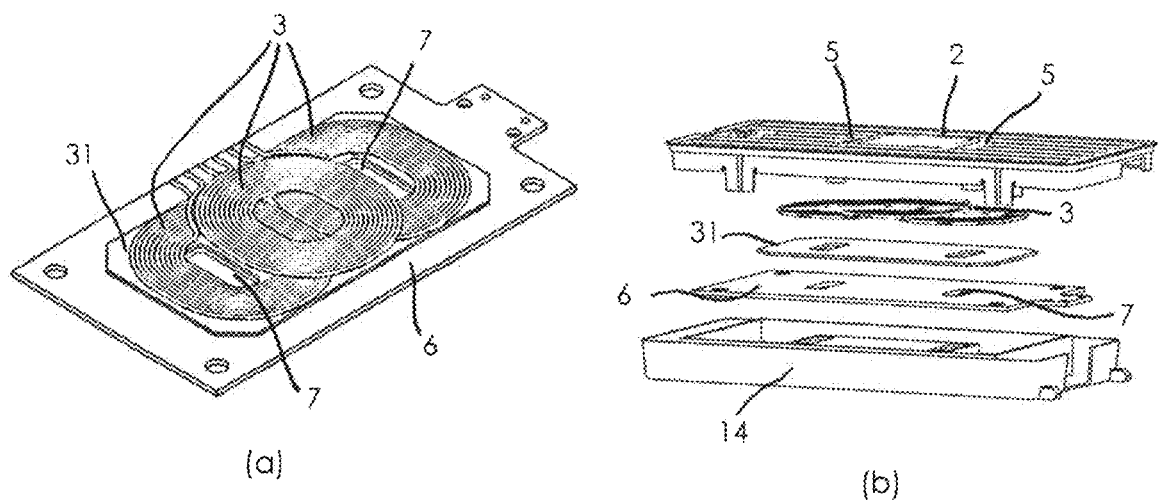
FIG. 4 shows components of the device according to FIG. 1 in various views.
Figure 5:
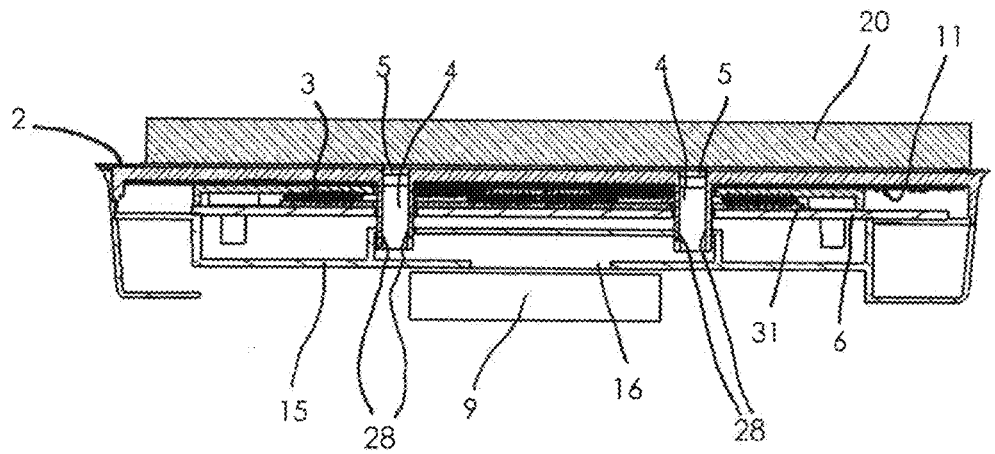
FIG. 5 shows the device according to FIG. 1 in the longitudinal section.

As is apparent, in particular, from FIGS. 4 and 5, three induction coils 3 are arranged directly under the support surface 2, offset with respect to one another, which are utilized for transmitting the electrical energy onto the energy receiver 20. It is understood that the device could comprise only one, two, or more induction coil(s).

As FIG. 4a shows, the induction coils 3 in the present exemplary embodiment are fastened on a carrier 6 and are fitted on a ferrite core 31. The winding of the outer induction coils 3 is provided in such a way that an open area remains in its particular center. In order to be able to route the air ducts 4 through the open areas in the center of the outer induction coils 3, recesses 7 are formed adjacent to the areas, in which the open areas are formed, in the carrier 6, and in the ferrite core 31. Walls 28 of the air ducts 4 and, therefore, the air ducts 4 themselves are routed through the outer induction coils 3 and the recesses 7 in the carrier 6. The arrangement of individual parts of the device 1 is apparent in the exploded representation shown in FIG. 4b.

The routing of the air ducts 4 through the induction coils 3 makes it possible to provide the openings 5 in a central area of the support surface 2. If the energy receiver 20, as shown in FIG. 2, is placed onto the support surface 2 and the turbomachine 9 is operated, air is drawn through the area between the support surface 2 and the energy receiver 20 and, in so doing, cools the energy receiver 20 and the device 1 not only in the edge area, but rather particularly well also in the central area.

Figure 6:
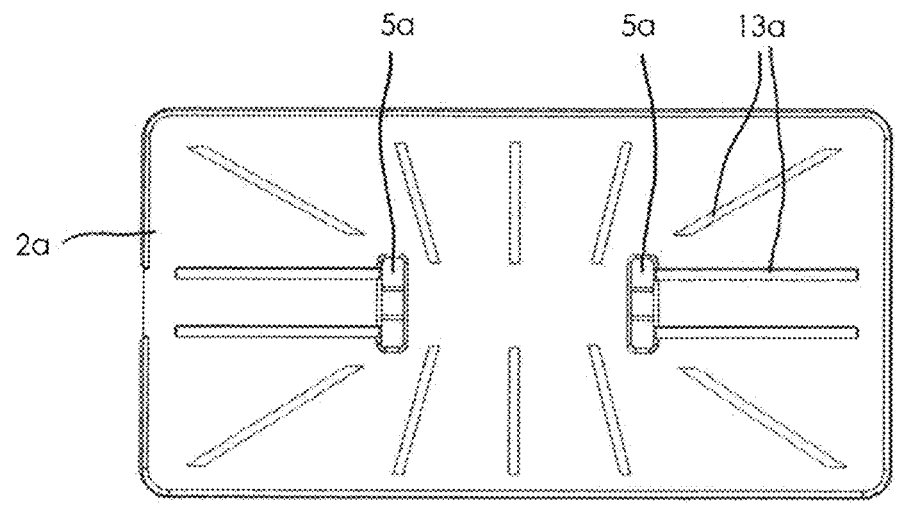
FIG. 6 shows a further device according to the invention in a top view.

The walls 28 of the air ducts 4, as is apparent, in particular, in FIG. 6, are designed to be closed so far into the device 1 that, when liquid reaches the support surface 2 and passes through the air ducts 4 into the device 1, the liquid can not come into direct contact with the induction coils 3 and further electrical components 11 provided in the device 1. Rather, the design of the device 1 can be provided in such a way that the liquid, when it has penetrated through the air ducts 4, can flow directly downward out of the device 1.

FIG. 1e shows that a turbomachine 9, which is preferably formed by an axial, diagonal, or radial ventilator, can be provided for moving air at the opening 16 formed in the base 15 of the device 1.

If the turbomachine 9, as provided in the preferred embodiment of the invention, is operated in such a way that the air is moved downward through the turbomachine 9 out of the device 1, air is drawn into the device 1 from the surroundings of the device 1, as explained above, through the air ducts 4.

In order to achieve a preferably good ventilation of the device 1 and, in particular, of the induction coils 3 as well as of the further electrically operated components 11, the device 1—apart from the air ducts 4 and the lateral walls 14—is designed to be as open as possible, i.e., in particular in such a way that no vertically arranged, closed walls are provided within the device 1, apart from the walls of the ducts 4. The air drawn in through the air ducts 4 can then circulate in the device 1 and, in so doing, cool the induction coils 3 as well as the components 11.

As is apparent, in particular, in FIG. 1c, linear projections 13 are formed on the support surface 2, which hold the smartphone 20, when placed thereon, at a distance from the bottom surface of the support surface 2, so that the air can flow uniformly between the support surface 2 and the smartphone 20. An alternative arrangement of linear projections 13a on a support surface 2a is shown in FIG. 6. The projections 13a are arranged radially toward openings 4a.

In a further exemplary embodiment (not shown here), the projections are provided on the support surface in the form of nubs. The nubs can be arranged, for example, in a grid-like manner, at regular intervals, or while forming the shapes shown in FIGS. 1 and 6.

The projections can comprise an elastomer at least at the top side facing away from the support surface 2, in order to prevent the smartphone 20 from slipping when the device 1 is moved.

The openings 5 can be provided with bars 29, in order to prevent objects, such as coins or the like, from penetrating the device 1 through the openings 5.

The device 1 is provided with fastening means, which comprise detent lugs 17 and a recess 18 for the engagement of a counterholder. With the aid of the fastening means, the device 1 can be fastened at an object, at which it is to be arranged. The reference number 19 characterizes contacting means for supplying the device 1 with electric current as well as for the electronic signal connection and/or data connection of the device 1 to another device.

With the aid of the fastening means 17, 18, the device can be mechanically fastened in the vehicle 21 and supplied with current with the aid of the contacting means 19 and, if necessary, connect a regulation and/or control device of the vehicle 21.

Figure 7:
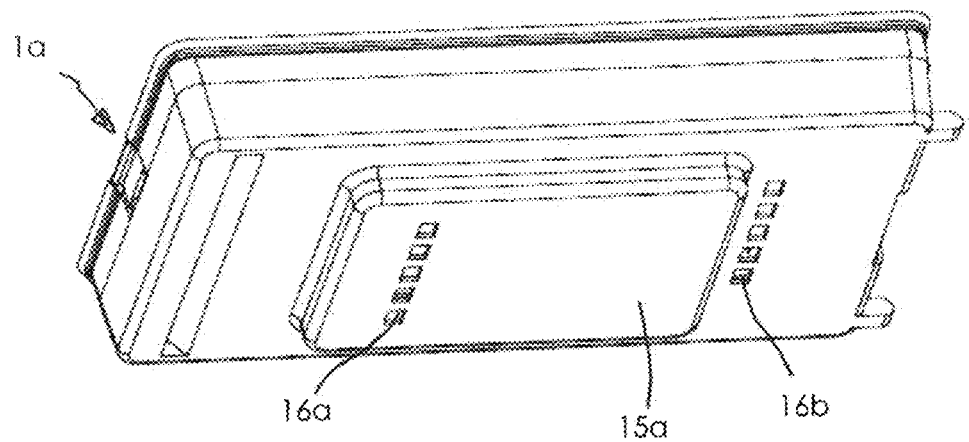
FIG. 7 shows a further device according to the invention in a perspective view.
Figure 8:
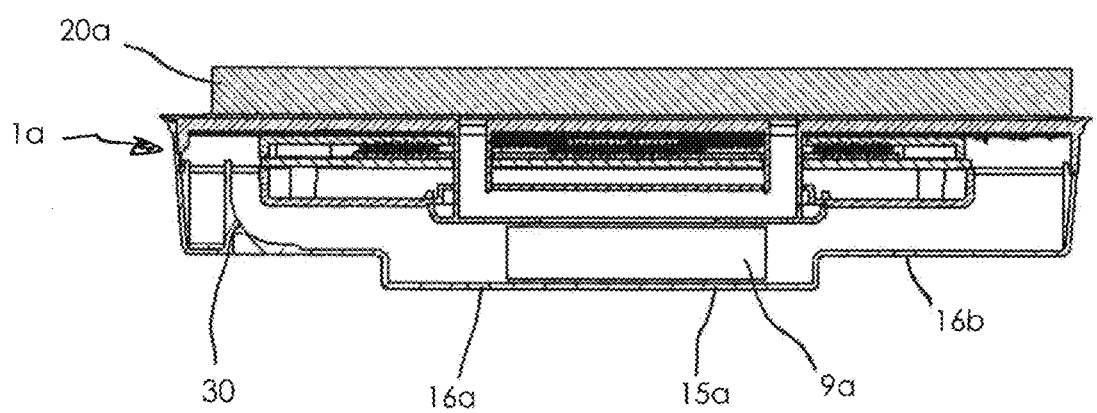
FIG. 8 shows the device according to FIG. 7 in the longitudinal section.

A further device 1a according to the invention, which is shown in FIGS. 7 and 8, differs from that according to FIG. 1 due to the fact that, among other things, a turbomachine 9a is arranged within the device 1a. The turbomachine 9a, which is designed as a centrifugal fan, is arranged on a base 15a. In order to be able to guide the air out of the device 1a, multiple openings 16a are formed in the base 15 directly next to the turbomachine 9. Further openings 16b, through which air can emerge from the device 1 through the base 15a, are shown on the right side in FIG. 7.

In the device 1a, in the sectional representation according to FIG. 8, a convexity 30 is shown on the left side, which is utilized for conducting an air flow arising from the centrifugal fan 9a toward induction coils 3a and further electrically operated components 11a, in order to achieve a better cooling effect there.

The invention claimed is:

1. A device for wireless transmission of electrical energy to an energy receiver, comprising: a support plate, on which the energy receiver is arrangeable during the energy transmission; at least one induction coil for the transmission of the electrical energy; a carrier for holding the induction coil, comprising a recess, wherein the carrier and the support plate are arranged on opposite sides of the induction coil; and at least one air duct comprising walls extending within the device from an opening formed in the support plate and arranged over the induction coil into the device, wherein the walls of the air duct extend perpendicularly downward from the opening and pass through an open area provided in a winding of the induction coil and through the recess so that the air duct is closed at least in an area in which the air duct extends from the opening in the support plate, through the induction coil and through the recess of the carrier, wherein the recess is aligned with the open area.

2. The device according to claim 1, wherein the induction coil is arranged directly under the support surface.

3. The device according to claim 1, further comprising a carrier for holding the induction coil, the carrier having a recess through which the air duct extends.

4. The device according to claim 3, wherein the carrier is a carrier plate.

5. The device according to claim 1, wherein the support surface is essentially rectangular and the opening is formed on or at least close to a longitudinal axis of the support surface.

6. The device according to claim 1, wherein the opening is formed at a distance from an edge of the support surface.

7. The device according to claim 6, wherein the opening is formed at a distance at least 1.5 cm from the edge of the support surface.

8. The device according to claim 6, wherein the opening is formed at a distance at least 2 cm from the edge of the support surface.

9. The device according to claim 1, further comprising a turbomachine for generating an air flow in the air duct, the turbomachine being configured to forming the air flow in a direction from the support surface into the air duct.

10. The device according to claim 1, further comprising means for directing air conducted through the air duct toward the induction coil and/or at least one further electrically operated component.

11. The device according to claim 10, wherein the air duct is additionally closed in an area in which the air duct extends past the further electrically operated component.

12. The device according to claim 1, wherein the air duct extends into an outlet area of the device through which liquid entering the device can flow out of the device.

13. The device according to claim 1, wherein at least one projection is formed on the support surface so as to hold the receiving unit at a distance from the support surface so that air to be conducted into the air duct flows underneath.

14. The device according to claim 13, wherein the projection comprises at least one fin and/or nub.

15. The device according to claim 1, wherein the device is configured as a component of a passenger compartment interior.

16. The device according to claim 15, wherein the device is configured for arrangement at a center console, an interior door trim, in a glove compartment, at a dashboard, and/or at a back side of a backrest of a seat of the passenger compartment interior.

17. A built-in unit of a passenger compartment of a vehicle, comprising a device according to claim 1.

18. A vehicle, comprising a device according to claim 1.

19. A method for wireless transmission of electrical energy to an energy receiver, comprising the steps of: arranging the energy receiver on a support plate for purposes of energy transmission; transmitting the electrical energy with aid of at least one induction coil; holding the induction coil with a carrier having a recess, wherein the carrier and the support plate are arranged on opposite sides of the induction coil; and moving air for cooling the energy receiver and/or the induction coil through at least one air duct comprising walls extending within the device from an opening formed in the support plate and arranged over the induction coil into the device, wherein the walls of the air duct extend perpendicularly downward from the opening and pass through an open area provided in a winding of the induction coil and through the recess so that the air duct is closed at least in an area in which the air duct extends from the opening in the support plate, through the induction coil and through the recess of the carrier, wherein the recess is aligned with the open area.

* * * * *